United States Patent [19]

Kratel et al.

[11] Patent Number: 4,604,272

[45] Date of Patent: Aug. 5, 1986

[54] PROCESS FOR THE PREPARATION OF SILICON TETRACHLORIDE

[75] Inventors: Günter Kratel, Durach-Bechen; Stefan Loskot, Kempten, both of Fed. Rep. of Germany

[73] Assignee: Wacker-Chemie GmbH, Munich, Fed. Rep. of Germany

[21] Appl. No.: 752,147

[22] Filed: Jul. 3, 1985

[30] Foreign Application Priority Data

Jul. 6, 1984 [DE] Fed. Rep. of Germany ....... 3424978
Oct. 19, 1984 [DE] Fed. Rep. of Germany ....... 3438444

[51] Int. Cl.$^4$ .................................................. C01B 33/08
[52] U.S. Cl. .................................... 423/343; 423/341; 423/342
[58] Field of Search ....................... 423/343, 341, 342

[56] References Cited

U.S. PATENT DOCUMENTS 3,130,011 4/1964 Evans et al. ......................... 423/343
4,035,169 6/1977 Sebenik et al. ...................... 423/495

OTHER PUBLICATIONS

EP-A-0077138, Iwai, Tadashi, Apr. 20, 1983.
CRC Handbook of Chemistry and Physics, 61st Edition pp. B-93, B-123, B-128, B-162, B-147, B-87.

*Primary Examiner*—John Doll
*Assistant Examiner*—Lori S. Freeman
*Attorney, Agent, or Firm*—Collard, Row & Galgano

[57] ABSTRACT

The invention relates to the preparation of silicon tetrachloride by reacting material containing $SiO_2$ with chlorine in the presence of carbon and metal halides and especially chlorides of the fifth main or subsidiary group of the Periodic Table at temperatures in the range of from 500° to 1200° C. The material containing $SiO_2$ has a BET surface area of at least 0.1 $m^2/g$ and the carbon has a BET surface area of at least 0.5 $m^2/g$.

18 Claims, No Drawings

PROCESS FOR THE PREPARATION OF SILICON TETRACHLORIDE

The present invention relates to the preparation of silicon tetrachloride by reacting material containing $SiO_2$ with chlorine in the presence of carbon and a catalyst.

Silicon tetrachloride is used in large quantities as the starting product for the preparation of highly dispersed silica. Furthermore, $SiCl_4$ serves, optionally indirectly via the preparation of $SiHCl_3$, as the starting material for the preparation of silicon of the highest grade which is suitable for semiconductor purposes.

In the preparation of organosilicon compounds and also in the preparation of "highest grade" silicon from $SiHCl_3$, silicon tetrachloride is obtained as an unwanted by-product. In industrial practice, no attention has therefore been paid to a method of synthesizing silicon tetrachloride and the secondary products thereof (including highly dispersed silica and "highest grade" silicon) which proceeds by way of the direct preparation known per se of silicon tetrachloride from material containing $SiO_2$ by reaction with chlorine.

The method of synthesis previously carried out on a commercial scale to obtain semiconductor silicon or silicon-organic compounds produces elemental silicon or ferrosilicon by reduction of material containing $SiO_2$. Products based on silicon, including $SiCl_4$ and also its secondary products, manufactured on a commercial scale therefore have to bear the constant burden of this synthesis step which is energy-consuming and expensive.

It is therefore an object of the invention to provide a method of synthesizing silicon tetrachloride, and therewith also a method of synthesizing secondary products of silicon tetrachloride, which is less costly as regards energy than the above-described synthesizing method which uses the reducing step to obtain elemental silicon.

According to EP-OS No. 77 138 it is already known to obtain silicon tetrachloride from material containing $SiO_2$ by reacting this with chlorine in the presence of carbon and boron trichloride. This process can be carried out at relatively low temperatures and, in principle, therefore makes it possible to prepare silicon tetrachloride with relatively little consumption of energy. The disadvantage of this process is that boron impurities are entrained in the silicon tetrachloride thus obtained. This process therefore has to be ruled out as a synthesis step for the preparation of "highest grade" silicon for semiconductor purposes, since even a boron content in a single figure ppm range is not acceptable in silicon used for semiconductors.

It has now been found that the direct synthesis of silicon tetrachloride from material containing $SiO_2$ by reaction with chlorine in the presence of carbon at relatively low temperatures produces a good yield if starting substances of large-surface area are used, and metal halides, and/or especially chlorides of the fifth main or subsidiary group of the Periodic Table, are used, as the catalysts. The chlorides of the fifth group being preferred.

The object of the invention is therefore achieved by the provision of a process for the preparation of silicon tetrachloride by reacting material containing $SiO_2$ with chlorine in the presence of carbon and a catalyst, which is characterized in that:

(a) a material having a BET surface area of more than 0.1 $m^2/g$ is used as the material containing $SiO_2$;
(b) the carbon has a BET surface area of at least 0.5 $m^2/g$;
(c) metal halides and/or especially chlorides of the fifth main or subsidiary group of the Periodic Table are used as the catalyst; and
(d) the reaction temperature ranges from 500° to 1200° C.

The material containing $SiO_2$ to be used according to the invention has a $SiO_2$ content of from 40 to 100% by weight, especially from 70 to 100% by weight.

The specific surface area, measured in accordance with the BET method, is preferably at least 3 $m^2/g$.

Examples of material containing $SiO_2$ to be used according to the invention are, inter alia, diatomaceous earth, siliceous chalk, silica, bentonite, montmorillonite, magnesium silicates, clays, zeolites poor in aluminum, and flue-dusts containing $SiO_2$.

The carbon used according to the invention is in finely divided form. The specific surface area is preferably at least 5 $m^2/g$ according to the BET method. Examples of carbon to be used according to the invention are, inter alia, carbon blacks, coke dust and activated charcoals.

The catalytically active chlorides of the fifth main and subsidiary group in the inventive process are especially $POCl_3$, $PCl_5$, $AsCl_3$, $AsCl_5$, $SbCl_3$, $SbCl_5$, $BiCl_3$, $VCl_3$, $VOCl_3$, $VCl_5$, $NbCl_5$, $TaCl_5$ and those substances that are converted into the above-mentioned chlorides under the conditions according to the invention may also be used. $POCl_3$ is preferably used.

The metal halides that may be considered are, inter alia, especially the chlorides and fluorides of the transition metals; for example, iron chloride, iron fluoride, cobalt chloride, cobalt fluoride, nickel chloride, nickel fluoride, chromium chloride, manganese chloride, manganese fluoride, copper chloride, copper fluoride, silver chloride and silver fluoride.

The molar ratio of $SiO_2$:carbon ranges from 4:1 to 1:10, especially from 1:1.5 to 1:2.

The weight ratio of catalyst:to the amount of $SiO_2$ used ranges from 1:3 to 1:1000 parts by weight, preferably 1:3 to 1:100.

The reaction temperatures range from 500° to 1200° C., preferably from 700° to 900° C.

To carry out the process, the material containing $SiO_2$, the carbon and optionally the catalyst are intimately mixed in the above-specified quantitative proportions. The individual components or mixtures thereof are subjected to a grinding process. The mixtures are preferably brought to reaction in granular form. For this purpose the mixtures, which may optionally contain a proportion of up to 20% by weight of a binder, are made into extrudable compositions and processed to form shaped bodies. The preparation is preferably carried out by forming a slurry or a paste from the mixtures with water.

Examples of binders that may be considered are, inter alia, water-glass, molasses, bentonite, resins, polyvinyl alcohol, polyvinyl acetate, cellulose, starches, and others.

Examples of shaped bodies into which the mixtures to be reacted according to the invention are formed for the reaction are balls, cylinders, hollow strands, rings and similar forms.

The mixtures are finally reacted in a current of chlorine, which optionally contains inert constituents, such as nitrogen, for example, to form silicon tetrachloride. The reactors used are mostly tube reactors. For continuous operation, fluidized bed arrangements are especially advantageous.

If the catalyst is a chloride from the fifth main or subsidiary group of the Periodic Table, it is advantageously introduced into the reactor in a gaseous state. This may be carried out in any suitable manner, e.g., by charging the chlorine current with the catalyst or, alternatively, by separate addition of the catalyst at the reactor entrance. If the metal halides used according to the invention as catalyst are used, it is best for the catalyst to be admixed with the previously described mixture of material containing $SiO_2$ and carbon.

The desired product $SiCl_4$ leaves the reactor in a gaseous state and is worked up according to conventional methods by condensing and distilling. The catalyst carried out with it is recovered and returned to the reaction zone.

Silicon tetrachloride can be successfully prepared according to the inventive process under relatively moderate conditions and thus in an energy- and cost-saving manner.

The invention will now be explained more fully in a number of examples which are, however, only given by way of illustration and not of limitation.

EXAMPLE 1

100 g of diatomaceous earth having a BET surface area of 3 $m^2/g$ were made into a viscous paste with 100 g of carbon black having a BET surface area of 20 $m^2/g$ with the addition of 4 g of bentonite using an aqueous solution that contained 2 g of nickel chloride. The mixture was processed to pellets of 0.5 cm diameter, dried, and calcined in a quartz tube in a current of nitrogen at 500° C. Chlorine was then introduced while increasing the temperature to 750° C. The reaction started at 730° C. with the formation of silicon tetrachloride.

COMPARISON EXAMPLE 1

The process of Example 1 was repeated, with the modification that, instead of diatomaceous earth, 100 g of beach sand having a specific surface area of 0.01 $m^2/g$ was used. The formation of silicon tetrachloride did not occur until a temperature of 1290° C. had been reached.

EXAMPLE 2

100 g of potter's clay having a BET surface area of 0.5 $m^2/g$ and a natural content of iron and titanium of 5% by weight (measured as oxides) were intimately mixed with 50 g of ground coke having a specific surface area of 1.3 $m^2/g$, and made into a viscous paste using an aqueous preparation of molasses. The mixture was shaped into pellets of 0.8 cm diameter, dried and calcined in a quartz tube in a nitrogen current at 500° C. While increasing the temperature to 720° C., chlorine was introduced. The reaction to form silicon tetrachloride started at 720° C.

EXAMPLE 3

A mixture of 5 parts by weight of diatomaceous earth (BET surface area 2 $m^2/g$) and 2 parts by weight of coke dust (BET surface area of 3 $m^2/g$) is shaped into cylindrical bodies 10 mm long and 3 mm in diameter and calcined at 400° C.

The calcined product was introduced into a reactor at a rate of 2 kg/h and, at a temperature of 800° C, was exposed to a chlorine current of 250 Nl/h. Prior to entering the reactor, the chlorine current was passed through a container filled with $POCl_3$, and was thereby charged with 5% by volume of $POCl_3$.

The mixture leaving the reactor was first cooled to 90° C., whereby $POCl_3$ that had been discharged was condensed out and returned to the container. After cooling the remaining gas current to 20° C., 4 kg/h of $SiCl_4$ were obtained.

While only several embodiments and examples of the present invention have been described, it is obvious that many changes and modifications may be made thereunto, without departing from the spirit and scope of the invention.

What is claimed is:

1. In a process for the preparation of silicon tetrachloride of the type including the step of reacting material containing $SiO_2$ with chlorine in the presence of carbon and catalytic concentrations of a catalyst, the improvement comprising:
   (a) said material containing $SiO_2$ having a BET surface area of more than 0.1 $m^2/g$;
   (b) said carbon having a BET surface area of at least 0.5 $m^2/g$;
   (c) said catalyst comprising at least one halide selected from the group consisting of:
      (1) a transition metal halide including iron chloride, iron fluoride, cobalt chloride, cobalt fluoride, nickel chloride, nickel fluoride, chromium chloride, manganese chloride, manganese fluoride, copper chloride, copper fluoride, silver chloride, and silver fluoride, and a combination thereof; and
      (2) a chloride of the fifth main or subsidiary group of the Periodic Table; and a combination thereof; and
   (d) the reaction temperature is in the range from 500° to 1200° C.

2. The process according to claim 1, wherein said halide is a chloride selected from the group consisting of $POCl_3$, $PCl_5$, $AsCl_3$, $AsCl_5$, $SbCl_3$, $SbCl_5$, $BiCl_3$, $VCl_3$, $VOCl_3$, $VCl_5$, $NbCl_5$, $TaCl_5$, those substances that are converted into said chlorides as a result of said reacting step and said parameters (a), (b), (c) and (d) associated therewith, and a combination thereof.

3. The process according to claim 1, wherein said catalyst comprises $POCl_3$.

4. The process according to claim 1, wherein said reaction temperature is in the range of from 700° to 900° C.

5. The process according to claim 1, wherein said material containing $SiO_2$ has an $SiO_2$ content of from 40 to 100% by weight.

6. The process according to claim 1, wherein said material containing $SiO_2$ has an $SiO_2$ content of from 70 to 100% by weight.

7. The process according to claim 1, wherein said material containing $SiO_2$ has a BET surface area of at least 3 $m^2/g$.

8. The process according to claim 1, wherein said material containing $SiO_2$ is selected from the group consisting of diatomaceous earth, siliceous chalk, silica, bentonite, montmorillonite, magnesium silicate, clay, zeolite poor in aluminum, flue-dust and a combination thereof.

9. The process according to claim 1, wherein said carbon is in finely divided form.

10. The process according to claim 1, wherein said carbon has a BET surface area of at least 5 m$^2$/g.

11. The process according to claim 1, wherein said carbon is selected from the group consisting of carbon black, coke dust, activated charcoal and a combination thereof.

12. The process according to claim 1, wherein said molar ratio of SiO$_2$:carbon is in the range of from 4:1 to 1:10.

13. The process according to claim 1, wherein said molar ratio of SiO$_2$:carbon is in the range of from 1:1.5 to 1:2.

14. The process according to claim 1, wherein the weight ratio of said catalyst:to the amount of SiO$_2$ used is in the range of from 1:3 to 1:1000 parts by weight.

15. The process according to claim 1, wherein said weight ratio of said catalyst:to the amount of SiO$_2$ used is in the range of from 1:3 to 1:100.

16. The process according to claim 1, additionally comprising the steps of:

intimately mixing said material containing SiO$_2$ and said carbon to produce a mixture wherein the molar ratio of SiO$_2$ to carbon is in the range of from 4:1 to 1:10;

subjecting said mixture to a grinding process to render the same granular in form; and reacting said mixture in the presence of said catalyst in a current of chlorine, the weight ratio of said catalyst:the amount of SiO$_2$ used being in the range of from 1:3 to 1:1000 parts by weight.

17. The process according to claim 1, wherein said catalyst is premixed with said material containing SiO$_2$ and carbon.

18. The process according to claim 1, wherein said mixture additionally contains up to 20% by weight of a binder.

* * * * *